United States Patent [19]

Fukamachi et al.

[11] Patent Number: 4,849,749

[45] Date of Patent: Jul. 18, 1989

[54] ELECTRONIC LOCK AND KEY SWITCH HAVING KEY IDENTIFYING FUNCTION

[75] Inventors: Masaaki Fukamachi; Nobuyuki Onitsuka; Masaru Yano; Kazuhiro Sakata, all of Miyazaki, Japan

[73] Assignee: Honda Lock Manufacturing Co., Ltd., Miyazaki, Japan

[21] Appl. No.: 18,589

[22] Filed: Feb. 25, 1987

[30] Foreign Application Priority Data

| | | | |
|---|---|---|---|
| Feb. 28, 1986 | [JP] | Japan | 61-043246 |
| May 6, 1986 | [JP] | Japan | 61-104411 |
| Aug. 14, 1986 | [JP] | Japan | 61-125153[U] |
| Dec. 29, 1986 | [JP] | Japan | 61-315782 |

[51] Int. Cl.[4] .......... H04Q 1/00; H04Q 7/00; E05B 47/00

[52] U.S. Cl. .......... 340/825.310; 340/825.560; 70/413; 70/278

[58] Field of Search .......... 340/825.56, 825.31; 361/172; 235/449, 450, 493, 382; 70/413, 278

[56] References Cited

U.S. PATENT DOCUMENTS

| | | | |
|---|---|---|---|
| 3,355,631 | 11/1967 | Christiansen . | |
| 3,911,252 | 10/1975 | Meyer | 235/450 |
| 4,177,453 | 12/1979 | Collins | 340/825.76 |
| 4,257,030 | 3/1981 | Bruhin et al. | 340/825.31 |
| 4,258,352 | 3/1981 | Lipschutz . | |
| 4,392,134 | 7/1983 | Lutz | 340/825.31 |
| 4,433,355 | 2/1984 | Chew et al. | 361/172 |
| 4,665,397 | 5/1987 | Pinnow | 340/825.56 |
| 4,712,398 | 12/1987 | Clarkson et al. | 361/172 |
| 4,717,816 | 1/1988 | Raymond et al. | 340/825.31 |
| 4,734,693 | 3/1988 | Dluhosch et al. | 340/825.31 |
| 4,758,835 | 7/1988 | Rathmann et al. | 340/825.31 |

FOREIGN PATENT DOCUMENTS

| | | |
|---|---|---|
| 320466 | 2/1975 | Austria . |
| 8534021 | 5/1986 | Fed. Rep. of Germany . |
| 156727 | 9/1982 | German Democratic Rep. . |
| 55-155879 | 12/1980 | Japan . |
| 61-166067 | 10/1986 | Japan . |

*Primary Examiner*—Donald J. Yusko
*Assistant Examiner*—Tyrone Queen
*Attorney, Agent, or Firm*—Frishauf, Holtz, Goodman & Woodward

[57] ABSTRACT

When a key is inserted into a key hole of a lock, magnetism creating means creates a magnetic flux corresponding to a predetermined magnetic code set in the key. Magnetism detecting means detects the magnetic flux and outputs a signal representing the detected magnetic flux. Decision means compares the signal value with a predetermined value, and outputs an agreement signal when the two values are the same. Driving means enables at least unlocking by key operation in response to the agreement signal. The magnetism detecting means outputs, as the above signal, a voltage corresponding to the magnitude of the detected magnetic flux or pulses having a frequency corresponding to same. At least one of material, dimensions, and thickness of the magnetic element determines the predetermined magnetic code. Further, an unlocking mechanism has a magnetic actuator which unlocks the lock by coupling the lock with unlocking means via a cam in response to the agreement signal.

19 Claims, 11 Drawing Sheets

ELECTRONIC LOCK AND KEY SWITCH HAVING KEY IDENTIFYING FUNCTION

BACKGROUND OF THE INVENTION

This invention relates to a lock and key system equipped with means for identifying a key used with such a cylinder lock for automotive vehicles or other applications.

Electronic lock and key systems for anti-theft purposes for doors of an automotive vehicle have been proposed, for example, by Japanese Provisional Patent Publication (Kokai) No. 55-155879, in which a key is provided with a code formed by magnetic means, and only when electronic means senses the key to be a proper one, a lock is unlocked.

As another example of such electronic lock and key system, U.S. Pat. No. 3,355,631 discloses a key actuated control circuit which has a detecting circuit comprising a reference oscillator, a plurality of LC oscillators connected in parallel with each other and to output terminals of the reference oscillator, and a key having a plurality of magnetic slugs arranged at regular intervals. The key actuated control circuit is constructed such that when the key is inserted in a key receptacle the slugs in the key cause the inductances of the coils of the respective corresponding LC oscillators to change, and only if the changed inductances of all the LC oscillators are tuned to the frequency of the reference oscillator, an oscillation signal is outputted to thereby effect unlocking.

However, a problem with this key control circuit is that to manufacture keys with different characteristics (codes) it is necessary to set the characteristics of slugs, by taking into consideration the frequencies of respective corresponding LC oscillators, wherefore the setting is complicated, making it difficult to manufacture keys with the same code. Besides, since each key has a plurality of magnetic slugs corresponding to respective L/C oscillators, a limitation is imposed upon increasing the number of key codes.

Further, according to U.S. Pat. No. 3,355,631, the manufacture of the L/C oscillators has to be strictly controlled so that each L/C oscillator generates an exact frequency, because otherwise erroneous key identification results.

Further, the construction of Japanese Provisional Patent Publication (Kokai) No. 55-155879 referred to hereinbefore, for example, cannot absolutely prevent socalled picking, i.e. forced unlocking of the door lock, breakage of the door lock, etc., even when the electronic means is operating to prohibit unlocking of the door lock, for the following reason: If a thief operates a rotor of the door lock without using the proper key but by means of a special tool, etc., he can rotate a cam lever provided on an end of the rotor to thereby rotate a locking lever of the door lock which is connected to the cam lever via an interlocking rod.

Also, there is known an electronic lock and key system equipped with remote control means for doors of automotive vehicles, for example, from U.S. Pat. No. 4,258,352, according to which the system comprises a transmitter for transmitting a coded message, a receiver (key sensor) provided in the vehicle for receiving the coded message from the transmitter, and a comparator for outputting a signal commanding unlocking the door lock only when the received coded message agrees with a preset reference coded message.

However, a problem with this system is that when the transmitter goes out of order or runs out of electric supply (due to exhaustion of the battery), it cannot output the signal to unlock the door lock.

In order to solve these problems, Japanese Provisional Utility Model Publication (Kokai) No. 61-166067, for example, has proposed a system wherein an infrared ray is employed as medium for transmission of the coded message. That is, an infrared-ray transmitter is incorporated in a key for a lock in a door of the vehicle in a manner making it possible to selectively unlock the lock, by means of the transmitter or by manually operating the key.

However, according to this prior art, since it is possible to unlock the door with the key, the system is not safe from illegal unlocking by so-called picking breakage of the door lock, etc., so that this system cannot perfectly guarantee prevention of theft.

SUMMARY OF THE INVENTION

It is an object of the invention to provide an electronic lock and key system having a simple construction and capable of identifying a key with high accuracy.

It is a further object of the invention to provide an electronic lock and key system which facilitates manufacturing keys with the same code, and also enables increasing the number of key codes with ease.

It is a still further object of the invention to provide an electronic lock and key system which, when applied to a door lock, is safe against illegal unlocking of the door lock through picking or breakage of the door lock.

According to the invention there is provided an electronic lock and key system which comprises: a key having at least one magnetic element forming a predetermined code; a lock having a key hole into which the key is to be inserted; magnetism creating means for creating a magnetic flux corresponding to the predetermined code when the key is inserted into the key hole of the lock; magnetism detecting means for detecting a magnetic flux created by the magnetism creating means and generating a signal indicative of the detected magnetic flux; decision means for comparing the value of the signal from the magnetism creating means with a predetermined value and, when the two values agree, generating an agreement signal; and driving means responsive to the agreement signal from the decision means for enabling at least unlocking of the lock by means of the key.

For example, the magnetism creating means comprises a magnet and a Hall element arranged around the key hole, and in this case, the magnetism detecting means generates the signal in the form of a voltage of a magnitude corresponding to the magnitude of the detected magnetic flux, and the decision means compares the voltage with a predetermined voltage value.

Alternatively, the magnetism creating means may comprise a coil arranged around the key hole, and in this case, the magnetism detecting means generates the signal in the form of pulses having a frequency corresponding to the magnitude of the detected magnetic flux. In this case, preferably, the decision means includes counter means for counting the number of pulses generated by the magnetism detecting means, and a comparator means for comparing a count value counted by the counter means with a predetermined value and generating a signal when the two values are equal.

Alternatively, the magnetism detecting means generates the signal in the form of a voltage converted from a pulse frequency corresponding to the magnitude of the detected magnetic flux, and the decision means compares the voltage with a predetermined voltage value.

According to the invention, therefore, the signal indicative of the detected magnetic flux is compared with a predetermined output voltage or output pulse in order to obtain the agreement signal, so that it is possible to detect a key with much higher precision than it is in the case of conventional systems described before.

Also, the predetermined code is formed based on at least one of material, dimensions, and thickness of the magnetic element. Therefore, the yield rate of manufacturing the keys of the same code becomes high, and also it is possible to increase the number of alternative codes that can be set in the keys.

Further, according to the invention, the electronic lock and key system includes an unlocking mechanism comprising unlocking means for unlocking the lock, interlocking means for mechanically interlocking the lock with the unlocking means, and an electromagnetic actuator connected to the interlocking means and responsive to the agreement signal from the decision means for causing the interlocking means to effect mechanical interlocking between the lock and the unlocking means to thereby enable the unlocking means to be operated by operating the lock.

Consequently, it is possible to absolutely prevent forcible unlocking of the door by picking, etc., when no agreement signal is generated by the output means.

The above and other objects, features and advantages of the invention will be more apparent from the ensuing detailed description taken in conjunction with the accompanying drawings.

DETAILED DESCRIPTION

The invention will now be described in detail with reference to the drawings showing several embodiments thereof.

Figure 1:
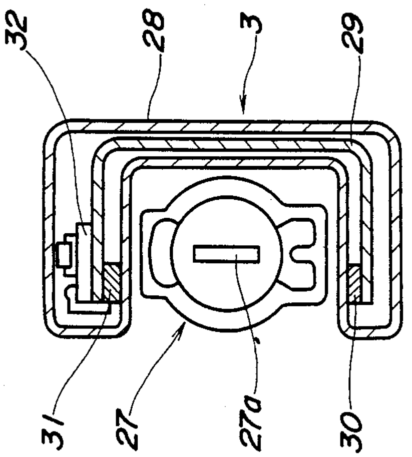
FIG. 1 is a cross-sectional view of a key sensing portion of the electronic lock and key system according to a first embodiment of the invention.

FIGS. 1 through 6 show an electronic lock and key system according to a first embodiment of the invention. FIG. 1 shows a key sensing device 3, which is adapted to sense a code signal from a key 26 when the key 26 is inserted in a cylinder lock 27. The key 26 contains a magnetic element forming a predetermined code, as described later.

In this embodiment, the key sensing device 3 has a case 28 of a U-shaped cross section arranged outside a door cylinder lock 27 with a key hole **27*a*, as shown in FIG. 1. A yoke 29 of a U-shaped cross section is housed within a case 28. A magnet 30 is inserted between an inner side face of one end of a yoke 29 and an inner wall face of the case 28, and a Hall element 31 as a magnetic sensing element is inserted between an inner side face of the other end of the yoke 29 and an inner wall face of the case 28. Also, an amplifier circuit 32 having a Hall element 31 as one of its components is provided on an outer side face of the other end of the yoke 29**.

Figure 2:
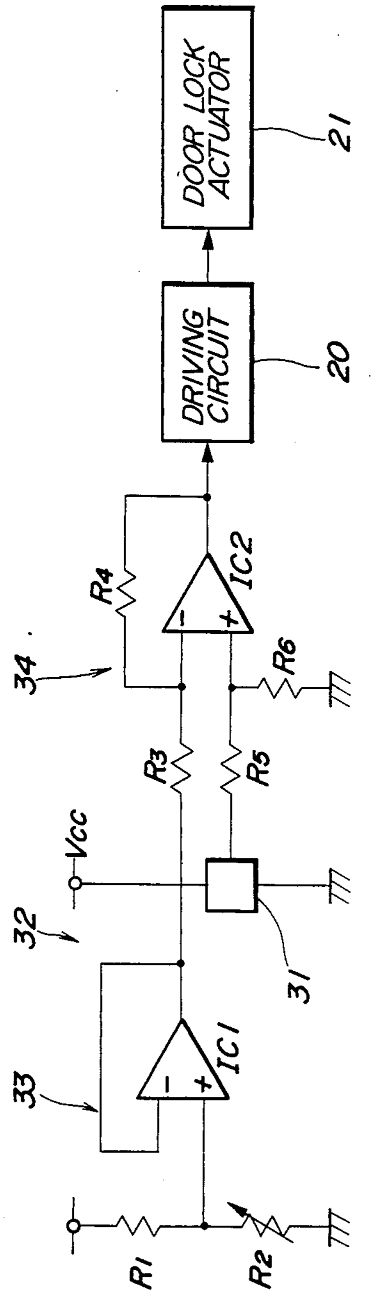
FIG. 2 is a circuit diagram showing an amplifier circuit appearing in FIG. 1.

As shown in FIG. 2, this amplifier circuit 32 is composed of a non-inverting amplifier (a voltage follower circuit) 33, a differential amplifier 34, and the Hall element 31. The non-inverting amplifier 33 comprises a first operational amplifier IC1, and resistances R1 and R2. A reference voltage at the junction between resistances R1 and R2 is inputted to a non-inverting input terminal of an operational amplifier IC1.

A differential amplifier 34 comprises a second operational amplifier IC2 and resistances R3 through R6. The reference voltage from the operational amplifier IC1 and an output voltage from the Hall element 31 are inputted to the inverting terminal and non-inverting terminal of an operational amplifier IC2, respectively, whereby the difference between the two voltages is amplified. The amplification factor of this differential amplifier 34 is determined by the resistance values of resistances R3, R4, R5, and R6.

The output terminal of the differential amplifier 34 is connected to a driving circuit 20, which is adapted to supply a door lock actuator 21 with a driving signal to thereby render the door lock unlockable, when the output from the differential amplifier 34 is within a predetermined range.

Figure 3:
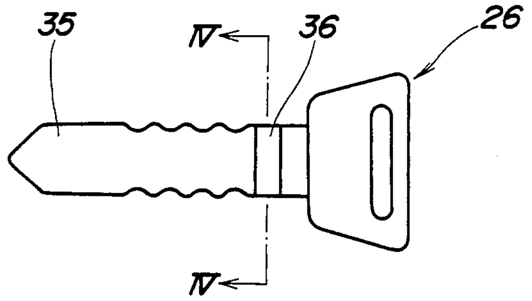
FIG. 3 is a side view of the key.
Figure 4:
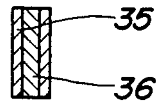
FIG. 4 is a cross-sectional view taken on line IV—IV in FIG. 3.
Figure 5:
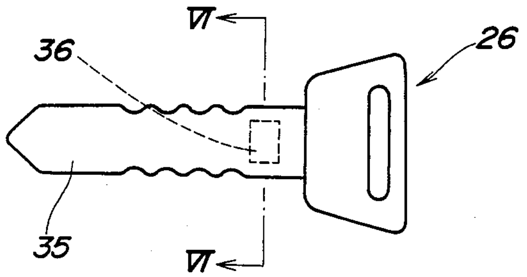
FIG. 5 is a side view of another example of the key.
Figure 6:
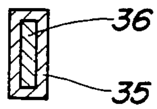
FIG. 6 is a cross-sectional view taken on line VI—VI of FIG. 5.

As shown in FIGS. 3 and 4, the key 26 has a magnetic element 36 composed of two magnetic element halves forming a predetermined code attached to opposite side surfaces of a non-magnetic key body 35. Alternatively, as shown in FIGS. 5 and 6, the key 26 may have a magnetic element 36 buried within a key body 35.

Incidentally, although the number of a magnetic elements 36 is used is not limited to one as in FIGS. 3 and 4, but may be two or more. The number of the magnetic sensing elements (Hall element 31) provided in the key sensing device 3 is not limited to one, either.

As regards the number of codes of the key 26, it is possible to obtain about 15 codes different in permeability by making the kind, size, and/or thickness of the magnetic element differ between magnetic elements manufactured.

In the amplifier circuit in FIG. 2, provided that a supply voltage Vcc is 10 volts (which is supplied from a control circuit 2), the maximum output voltage of the second operational amplifier IC2 is 8.5 volts, the output voltage of the Hall element 31 with the key 26 removed from the door cylinder lock 27 is 1 volt, the reference voltage from the operational amplifier IC1 is 1 volt, and the amplification factor of the second operational amplifier IC2 is 50, then the output voltage from the second operational amplifier IC2 with the key 26 removed from the door cylinder lock 27 becomes 0 volt. On the other hand, if the output voltage of the Hall element 31 with the key 26 inserted in the door cylinder lock 27 is 1.1 volts, then the output voltage of the second operational amplifier IC2 is as follows:

$$(1.1-1)\times 50=5\ (v)$$

The output voltage of the Hall element 31 is determined by the permeability of the magnetic element 36 provided in the key 26, so that if it is desired that the output voltage of the second operational amplifier IC2 assumes 15 different values within a range from 0 to 8.5 volts, 15 different kinds of magnetic elements 36 should be provided which are different in the permeability such that the output voltage of the Hall element 31 assumes different values as shown in the following table.

| No. | Output V. of Hall Element (Central Value) | Output V. of Hall Element | Output V. of IC2 |
|---|---|---|---|
| 1 | 1.024 | 1.020–1.028 | 1.0–1.4 |
| 2 | 1.034 | 1.030–1.038 | 1.5–1.9 |
| 3 | 1.044 | 1.040–1.048 | 2.0 -2.4 |
| 4 | 1.054 | 1.050–1.058 | 2.5–2.9 |
| 5 | 1.064 | 1.060–1.068 | 3.0–3.4 |
| 6 | 1.074 | 1.070–1.078 | 3.5–3.9 |
| 7 | 1.084 | 1.080–1.088 | 4.0–4.4 |
| 8 | 1.094 | 1.090–1.098 | 4.5–4.9 |
| 9 | 1.104 | 1.100–1.108 | 5.0–5.4 |
| 10 | 1.114 | 1.110–1.118 | 5.5–5.9 |
| 11 | 1.124 | 1.120–1.128 | 6.0–6.4 |
| 12 | 1.134 | 1.130–1.138 | 6.5–6.9 |
| 13 | 1.144 | 1.140–1.148 | 7.0–7.4 |
| 14 | 1.154 | 1.150–1.158 | 7.5–7.9 |
| 15 | 1.164 | 1.160–1.168 | 8.0–8.4 |

FIGS. 7 through 11 show a second embodiment of the invention.

Figure 7:
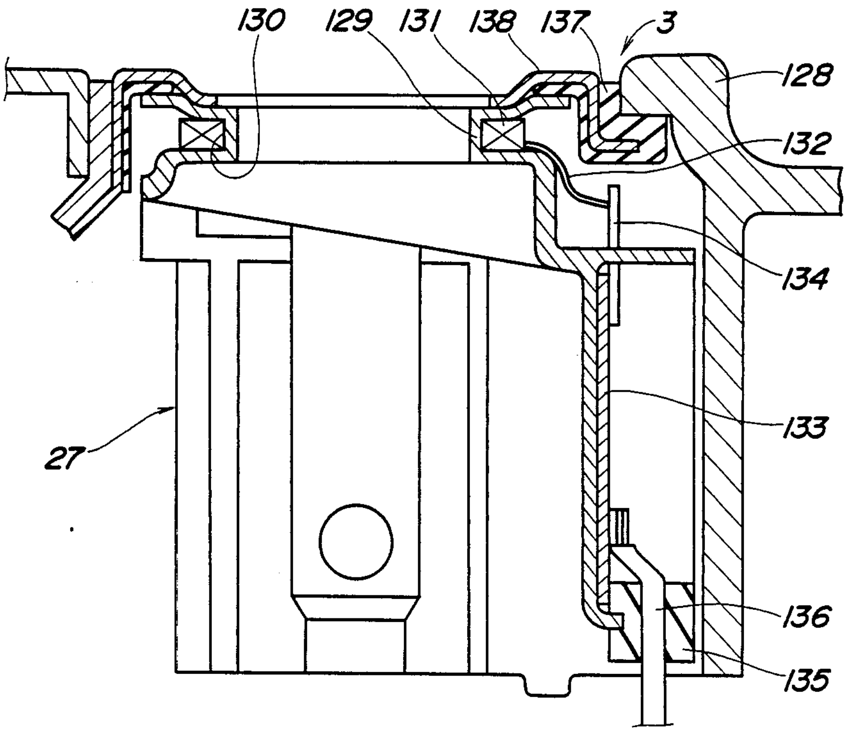
FIG. 7 is a cross-sectional view of a cylinder lock case of the electronic lock and key system according to a second embodiment of the invention.

FIG. 7 shows a key sensing portion of the electronic lock and key system. Part of a key sensing device 3 is incorporated in a cylinder lock 27 provided in a door handle case 28. An annular recess 130 is formed in the outer periphery of an open end of a cylinder case 129 of the cylinder lock 27 through which a key 26 is to be inserted. A coil 131 is fitted in an annular recess 130. A lead wire 132 extends from a coil 131 and is connected to a terminal 134 attached to a base plate 133 fixed on a cylinder case 129. Connected to a base plate 133 is a cord 136, which extends through a grommet 135 to the processing circuit of FIG. 10. The open end of the cylinder case 129 is attached to the door handle case 128 via a packing 137. The open end portion of the cylinder case 129 is formed of a non-magnetic material and is covered with a covering 138 retained in place by a packing 137.

Figure 8:
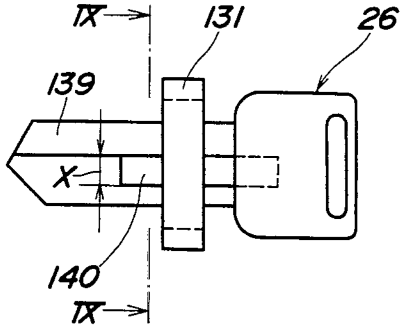
FIG. 8 is a side view of a key employed in the second embodiment.
Figure 9:
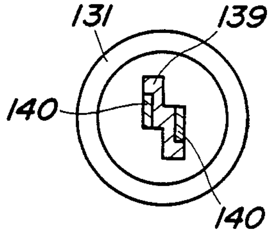
FIG. 9 is a cross-sectional view taken on line IX—IX in FIG. 8.

As shown in FIGS. 8 and 9, elongate magnetic elements 140 each having a suitable thickness (e.g. 0.3 mm) and a width x are secured to opposite side surfaces of an inserting portion 139 of the key 26 such that the magnetic elements 140 extend in the direction in which the key 26 is inserted into the cylinder lock 27. By suitably selecting the width x, etc. it is possible to set the inductance of the coil 131 to any desired value. A magnetic element may alternatively be buried within an inserting portion 139 of the key 26.

Figure 10:
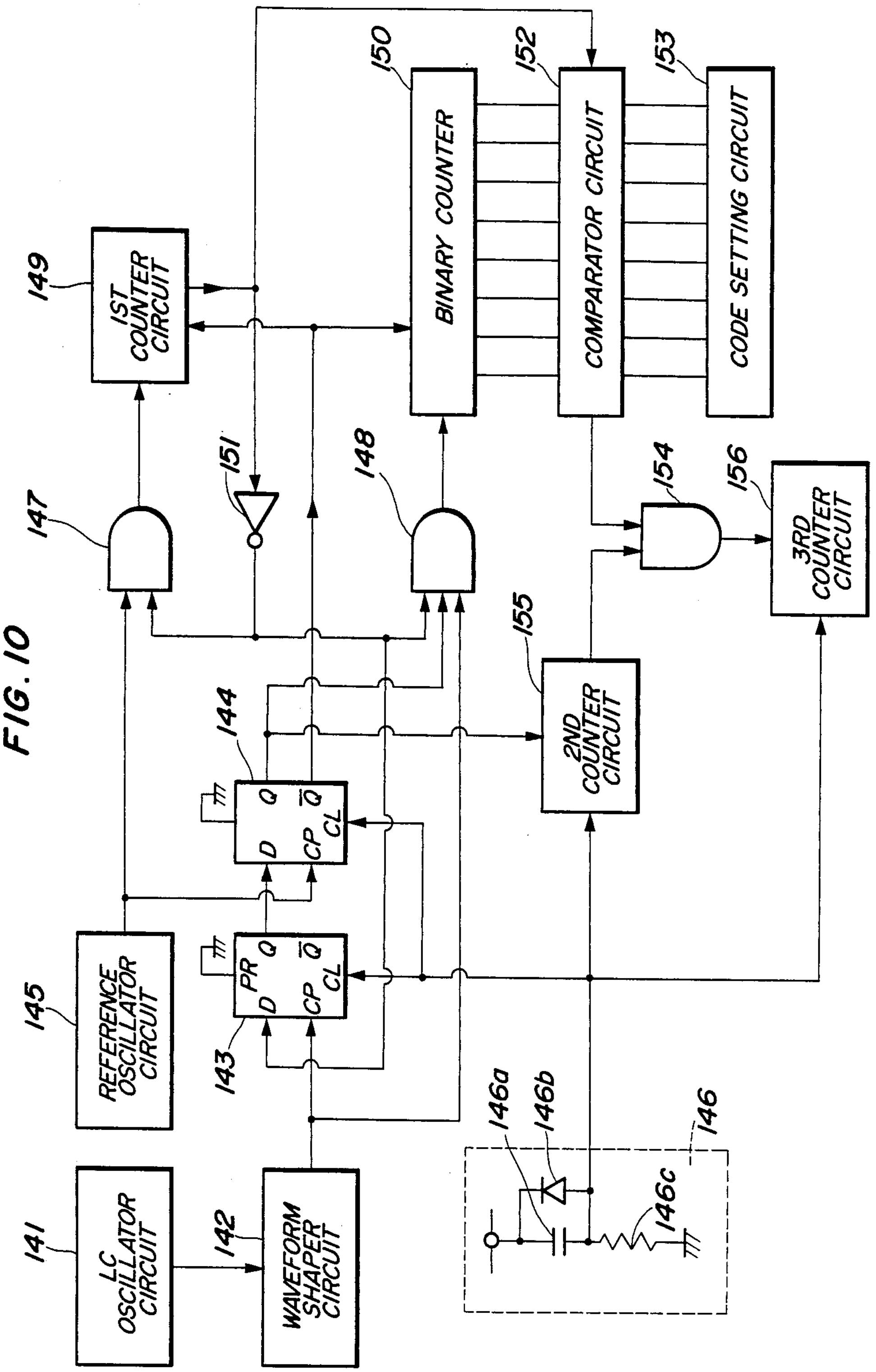
FIG. 10 is a circuit diagram showing a key identifying circuit employed in the second embodiment.

A processing circuit in the control circuit 2 is constructed, for example, as shown in FIG. 10. An LC oscillator circuit 141, which generates a frequency determined based on the inductance L of the coil 131 and a built-in capacitor C, not shown, is connected to a waveform shaper circuit 142 for shaping the oscillation output into a square waveform. The output of waveform shaper circuit 142 is supplied to a clock input terminal cp of a first D flip-flop 143. An output terminal Q of the first D flip-flop 143 is connected to an input terminal D of a second D flip-flop 144, whose clock input terminal cp is supplied with output from a reference oscillator circuit 145 which generates a reference frequency and is formed of a crystal resonator for example. The D flipflops 143 and 144 have clear terminals CL, CL supplied with output from a power-on-reset circuit 146, which is formed of a capacitor **146*a*, a diode 146*b* in parallel to the capacitor 146*a*, and a resistance 146*c* grounded and connected in series to the capacitor 146*a* and diode 146*b*. The power-on-reset circuit 146 is adapted to generate via the junction between the resistance 146*c* and the capacitor 146*a*** a high level output for a fixed time period after supply of the supply voltage is started.

Also, the output of a reference oscillator circuit 145 is supplied to a first input terminal of an AND circuit 147, whose second input terminal is connected to a first input terminal of an AND circuit 148. A second input terminal and a third input terminal of an AND circuit 148 are connected, respectively, to an output terminal Q of a second D flip-flop 144 and the output terminal of the waveform shaper circuit 142. Further, the output of the AND circuit 147 is supplied to an input terminal of a first counter circuit 149, which in turn has a reset pulse input terminal connected to an inverting output terminal $\overline{Q}$ of the second D flip-flop 144, as well as to an 8-bit binary counter 150. On the other hand, an output terminal of the first counter circuit 149 is connected to the second input terminal of the AND circuit 147 via an inverter 51 as well as to a comparator circuit 152. The first counter circuit 149 is disposed to count the number of output pulses supplied from the reference oscillator circuit 145 via the AND circuit 147. When the count value reaches a predetermined value (e.g. 434), the output goes high, and when the output from the inverting output terminal $\overline{Q}$ of the second D flip-flop 144 goes high, the count value is cleared.

Output from the AND circuit 148 is supplied to binary counter 150, which counts the number of square wave pulses supplied from the waveform shaper circuit 142 through the AND circuit 148, the count value being cleared each time the output from the inverting output terminal Q of the second flip-flip 144 goes high.

Also connected to the comparator circuit 152 is a code setting circuit 153 capable of outputting 8-bit data by means of a dip switch or example. The output of the comparator circuit 152 is supplied to a first input terminal of an AND circuit 154, and the output of a second counter circuit 155 is supplied to the second input terminal of AND circuit 154. Further, the output of the AND circuit 154 is supplied to a third counter circuit 156, which is connected to the power-on-reset circuit 146 as in second counter circuit 155. The output terminal $\overline{Q}$ of the second D flip-flop 144 is connected to the second counter circuit 155. The second counter circuit 155 counts the number of the trailing edges of output pulses from the output terminal Q of the second D flip-flop 144, and each time the count value reaches a predetermined value (e.g. 7), its output goes low, while each time the output of the power-on-reset circuit 146 goes high, the count value is cleared. Also, third counter circuit 156 counts the number of the leading edges of output pulses of the input AND circuit 154, and when the count value exceeds a predetermined value (e.g. 4) its output goes high, while each time the output of the power-on-reset circuit 146 goes high, the count value is cleared.

The D flip-flops 143, 144 are each arranged such that each time it receives the leading edge of an input pulse via the clock input terminal cp an output indicative of the state of the input terminal D is generated, and when the input to the clear terminal CL goes high, the outputs from the output terminals Q, $\overline{Q}$ go low and high, respectively.

Figure 11:
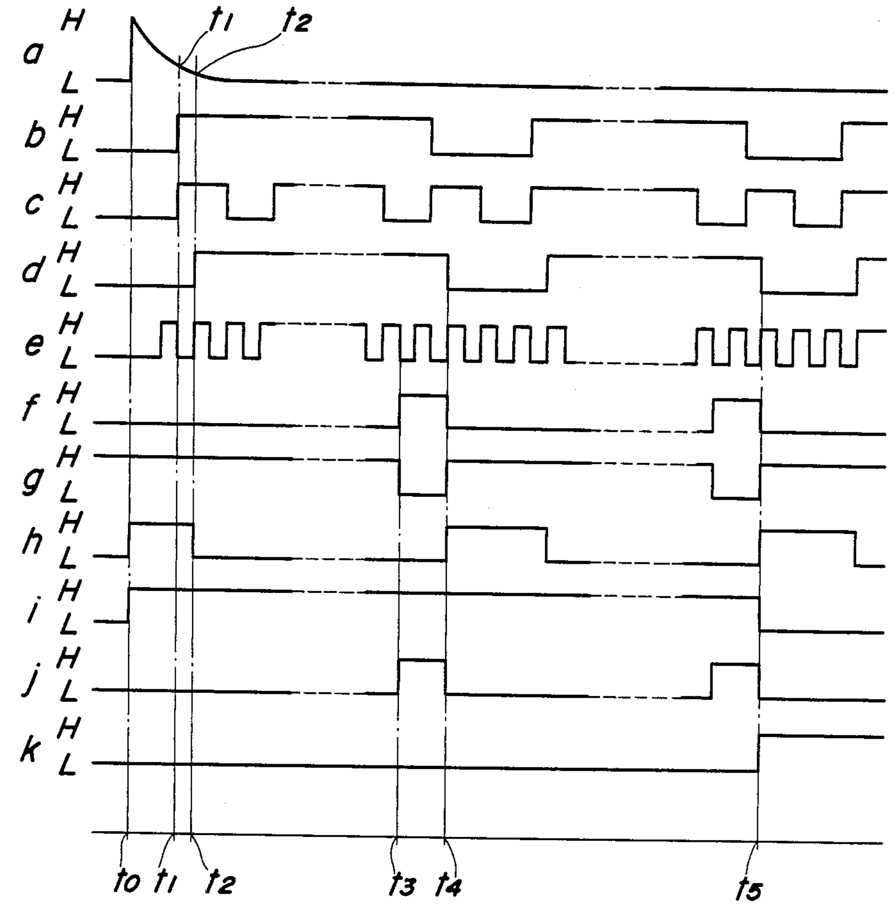
FIG. 11 shows a timing chart useful in explaining the operation of the circuit of FIG. 10.

Referring next to FIG. 11, the operation of the key sensing device 3 and the processing circuit of the second embodiment will be described. First, when the key 26 is inserted into the cylinder lock 27 to supply power to the key sensing device 3 at a time to in FIG. 11, the output level from the power-on-reset circuit 146 rises (a in FIG. 11), whereupon the count values of the second and third counter circuits 155, 156 are both cleared. At the same time the output level at the output terminal $\overline{Q}$ of the second D flip-flop-144 goes high (H) so that the count values of the first counter circuit 149 and the binary counter 150 are both cleared. Then, at the time t1, which is reached after the lapse of a predetermined time period from t0, the output level of the power-on-reset circuit 146 becomes low (L).

The oscillatory output of a frequency corresponding to the inductance of the coil 131 from the LC oscillator circuit 141 is shaped by the waveform shaper circuit 142 (c in FIG. 11). Upon the leading edge of each output shaped square wave pulse the output level of the output terminal Q of the first D flip-flop 143 becomes high (H) (b in FIG. 11). On the other hand, the reference oscillator circuit 145 outputs square wave pulses having a predetermined frequency (e.g. 62.5 kHz) (e in FIG. 11). Upon the leading edge of each output pulse from the reference oscillator circuit 145 the output level of the output terminal Q of the second flip-flop 144 goes high (H) (d in FIG. 11), and simultaneously the output level of the inverting output terminal $\overline{Q}$ goes low (L) (h in FIG. 11). At this time the output level of the first counter circuit 149 is low, and a high level output from the inverter 151 is inputted to the AND circuit 147 and the AND circuit 148. The AND circuit 148 is further supplied with a high level output from the output terminal Q of the D flip-flop 144. Therefore, at a time t2 at which the output from the output terminal $\overline{Q}$ of the D flip-flop 144 goes low, the first counter circuit 149 starts counting square wave pulses supplied from the reference oscillator circuit 145 via the AND circuit 147, and also the binary counter 150 starts counting output pulses supplied from the waveform shaper circuit 142 via the AND circuit 148 and having a frequency corresponding to the inductance of the coil 131. When the count value of the first counter circuit 149 reaches a predetermined value (e.g. 434), say at a time t3 in FIG. 11, the output level of the first counter circuit 149 becomes high (f in FIG. 11), and the output level of the inverter 151 becomes low (g in FIG. 11), whereby the output of the reference oscillator circuit 145 is prohibited from being inputted to the first counter circuit 149 via the AND circuit 147, and at the same time the output of the waveform shaper circuit 142 is prohibited from being inputted to the binary counter 150 via the AND circuit 148.

Then, the comparator circuit 152 compares the count value of the binary counter 150 at t3 with a set value (e.g. a binary number of 11000110). When the two values are equal, the output from the comparator circuit 152 goes high (j in FIG. 11). At this time the count value of the second counter circuit 155 has not reached a predetermined value (e.g. 7), so that the output level of the second counter circuit 155 is high (i in FIG. 11). Accordingly the output of the AND circuit 154 rises to a high level and the count value of the third counter circuit 156 is increased by 1.

On the other hand, as noted before, the output level of the inverter 151 is low until the time t3 (g in FIG. 11) sot hat the output level of the output terminal Q of the first D flip-flop 143 becomes low upon the leading edge of an output pulse generated from the waveform shaper circuit 142 immediately after t3 (b in FIG. 11). Also, upon the leading edge of an output pulse generated from the oscillator circuit 145 immediately thereafter the output level of the output terminal Q of the second D flipflip 144 becomes low and the output level of the inverting output terminal $\overline{Q}$ becomes high (h in FIG. 11 at a time t4).

As a consequence, at t4 the first counter circuit 149 and the binary counter 150 have their count values cleared, whereby the output level of the first counter circuit 149 becomes low again (f in FIG. 11), i.e. the same level assumed at t1.

When this operation is repeated seven times, which is equal to the set count value of the second counter circuit 155, the output of the second counter circuit 155 turns from high level to low level (i in FIG. 11 at a time t5), so that the output level of the AND circuit 154 goes low, whereupon the third counter circuit 156 is prevented from counting. At this time t5, if the count value of the third counter circuit 156 is equal to a predetermined value (e.g. 4 or larger), then a high-level output (key identifying signal) is supplied by the third counter circuit 156 (k in FIG. 11). When this key identifying signal is generated, it is assumed that the code of the key 26 agrees with the code set by a code setting circuit 153.

Figure 12:
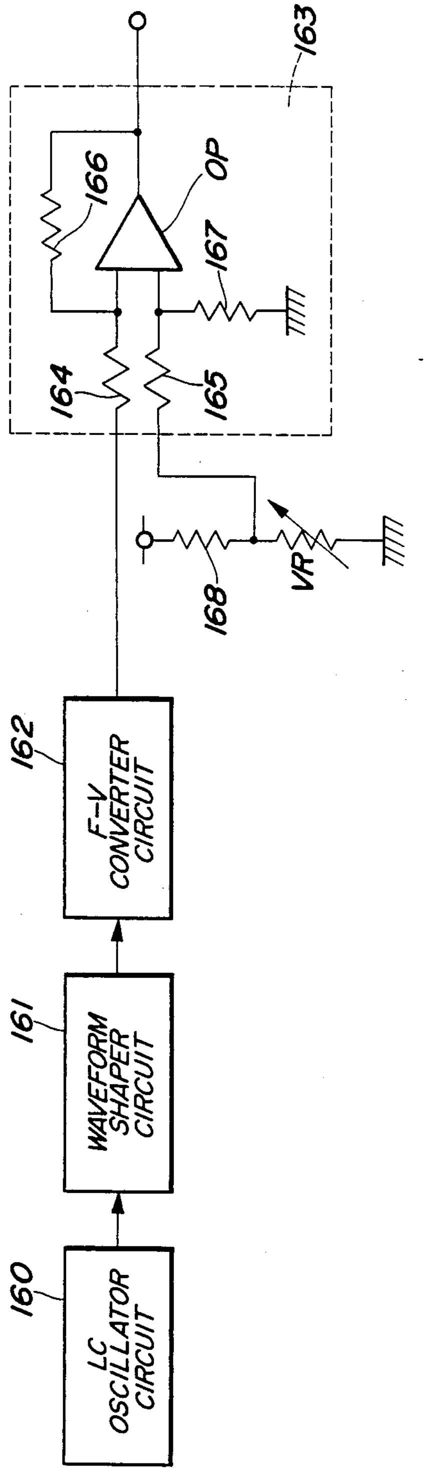
FIG. 12 is a circuit diagram showing the construction of a key sensing portion according to a third embodiment of the invention.

FIG. 12 shows a third embodiment of the invention, wherein all component elements and parts but those appearing in FIG. 12 are identical with those shown in FIGS. 7 through 9 of the second embodiment, illustration of which is therefore omitted.

Although in the second embodiment described above the processing circuit of the key sensing device 3 digitally processes various signals, the third embodiment employs analog signal processing. Referring to FIG. 12, the output side of an LC oscillator circuit 160, whose frequency is determined based on the inductance of the coil 131 (FIG. 7), is connected to the input side of a waveform shaper circuit 161 (the circuits 160 and 161 can be constructed similarly to the circuits 141 and 142 of the second embodiment). The output side of the waveform shaper circuit 161 is connected to the input side of a frequency-to-voltage (F-V) converter circuit 162. The output side of the F-V converter circuit 162 is connected to one of input terminals of a differential amplifier circuit 163 which is composed of resistances 164 through 167 and an operational amplifier OP. The other of the input terminals of the differential amplifier circuit 163 is connected to a junction between a resistance 168 connected to the power source and a variable resistor VR, which is a voltage dividing point having a predetermined reference voltage.

The operation of the third embodiment constructed as above will now be described.

When the key 26 is inserted into the cylinder lock 27, output pulses from the LC oscillator circuit 160 having a frequency corresponding to the inductance of the coil 131 are shaped by the waveform shaper circuit 161 into square wave pulses. The shaped square wave pulses are applied to the F-V converter circuit 162, which then outputs a voltage porportional to the frequency of the square wave pulses, and supplies same to the differential amplifier circuit 163. The circuit 163 in turn outputs a voltage proportional to the difference between the input voltage and the predetermined reference voltage at the junction between the resistance 168 and the variable resistor VR.

Details of the above operation will be further explained by the use of exemplary values. If the supply voltage is 10 volts, the output voltage of the F-V converter circuit 162 is 8.5 volts when the input frequency is 50 kHz, the output frequency of the LC oscillator circuit 160 is 32 kHz when the key 26 is not inserted in the cylinder lock 27, and the output frequency of the LC oscillator circuit 160 is 28.5 kHz when the key 26 is inserted in the cylinder lock 27, then the output voltage of the F-V converter circuit 162 with the key 26 inserted will become 4.845 volts while the output voltage of same with the key 26 removed will become 5.44 volts. Therefore, if the set voltage which is determined by the resistance 168 and the variable resistor VR is set to 5.245 volts, and the amplification factor of the operational amplifier is set to 20, then the output voltage of the operational amplifier with the key inserted, that is, the output voltage upon identification of the proper key will become 8 volts. This key identifying output voltage can be set to a desired value by suitably selecting the width of the magnetic element(s) 140, etc.

FIGS. 13 through 17 show a fourth embodiment of the invention, which provides an improvement in the unlocking mechanism of the door lock forming part of the electronic lock and key system of the invention.

Figure 13:
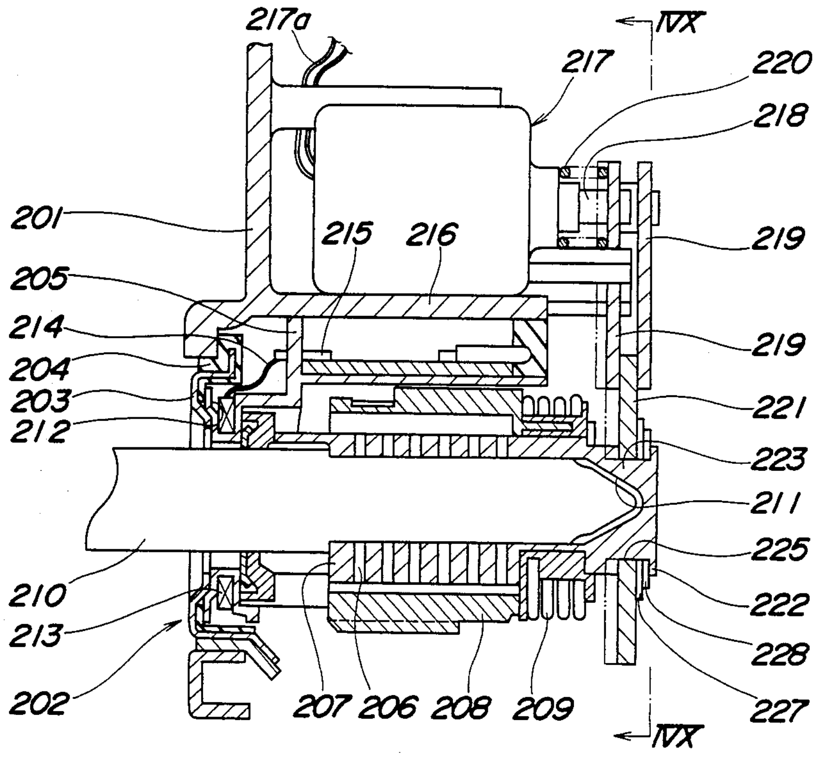
FIG. 13 is a longitudinal cross-sectional view of an unlocking mechanism of the door lock of the electronic lock and key system according to a fourth embodiment of the invention.
Figure 14:
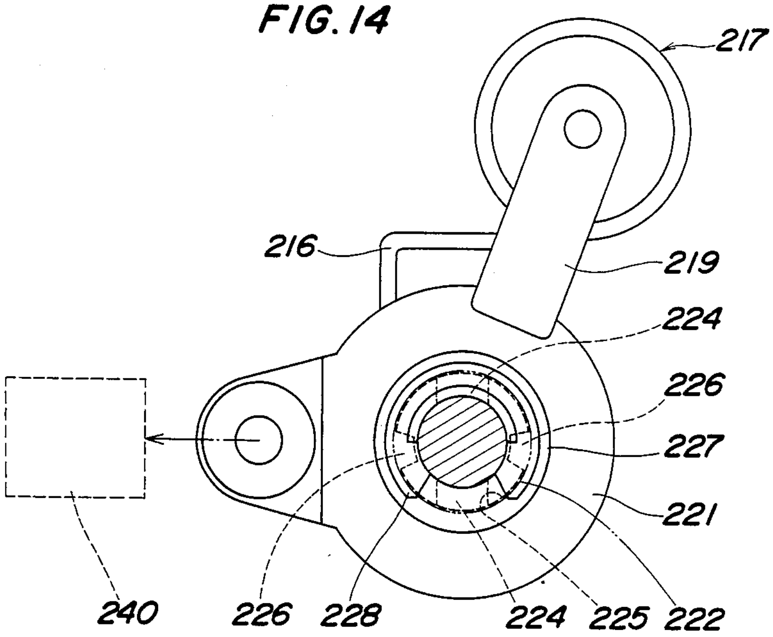
FIG. 14 is a cross-sectional view taken on line IVX—IVX in FIG. 13.

First, FIGS. 13 and 14 show the unlocking mechanism. A covering 203 is mounted, via a packing 204, on a key-inserting open end of a door lock 202 mounted within an outer handle case 201. A cylinder case 205 is mounted within the outer handle case 201 at a location inward of the covering 203. A rotor 207 is housed within the cylinder case 205, which is formed with a plurality of tumbler slots 206 in which tumblers, not shown, are fitted. The rotor 207 is supported by a rotor holder 208 which is provided with a return coil spring 209 for maintaining the rotor 207 in its neutral position. The rotor 207 has an end portion thereof formed with an internal conical recess 211 on which tip of the key 210 is to be seated.

An annular recess 212 is formed in the outer periphery of one end of the cylinder case 205 (i.e. leftward in FIG. 13) defining the key hole. A sensing coil 213 forming a part of the key sensing device is fitted in the annular recess 212, and is connected to a printed circuit board 215 via a lead wire 214. A processing circuit, not shown, is provided on the circuit board 215, which is adapted to discriminate a code in the key by means of the inductance of the sensing coil 213 for example, which s varied by code-setting magnetic element(s) (not shown) provided in the key 210, and generate a predetermined key identifying signal upon discriminating a proper code.

A solenoid 217 is provided on a base 216, which is formed integrally with the outer handle case 201. A plunger 218, as the actuator for the solenoid 217, is disposed to be magnetically drawn axially of the rotor 207 toward the key-inserting open end of the door lock 202 (leftward as viewed in FIG. 13) against the force of a spring 220 when the solenoid 217 is energized. When the solenoid 217 is deenergized, the plunger 218 is biased away from the key-inserting open end of the door lock 202 (rightward as viewed in FIG. 13) by the force of the spring 220 interposed between a pair of plates 219, 219 attached to the plunger 218 and a casing of the solenoid 217. A cam plate 221 is held between peripheral portions of the plates 219, 219. The cam plate 221 has a central hole 225 fitted on an inner end of the rotor 207. A lead wire 217a extends from the solenoid 217 and is connected to the processing circuit.

Figure 15:
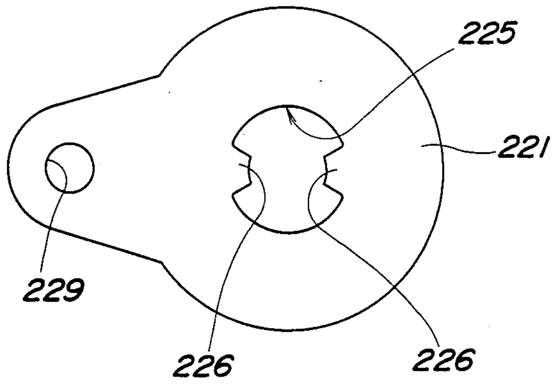
FIG. 15 is a side view of a cam plate appearing in FIG. 13.

Details of the connection between the cam plate 221 and the rotor 207 will now be described by referring to FIGS. 14 and 15. The inner end of the rotor 207 is formed integrally with an annular flange 222, a thinned portion 223 adjacent the flange 222 at a left side thereof as viewed in FIG. 13, and a pair of engaging protuberances 224, 224 axially spaced from the flange 222 by a predetermined distance and arranged at circumferentially opposite locations. Fitted on the thinned portion 223 is the central hole 225 of the cam plate 221. The engaging hole 225 is formed with a pair of engaging protuberances 226, 226 protruding radially inwardly and arranged at circumferentially opposite locations.

The diameter of a circle passing the outer peripheral edges of the engaging protuberances 224, 224 is approximately equal to the maximum diameter of the engaging hole 225. Also, the diameter of a circle passing the inner peripheral edges of the engaging protuberances 226, 226 is approximately equal to the outer diameter of the thinned portion 223. A plain washer 227 and an E ring 228 are fitted on the inner end of the rotor 207 and interposed between the flange 222 and the cam plate 221. A rod hole 229 is formed in an internal extension of the cam plate 221 to receive therethrough a rod, not shown, which is connected to the door lock unlocking mechanism 240. The door lock unlocking mechanism 240 includes a door lock locking lever, not shown, interlocked with the cam plate 221 via the rod.

Figure 16:
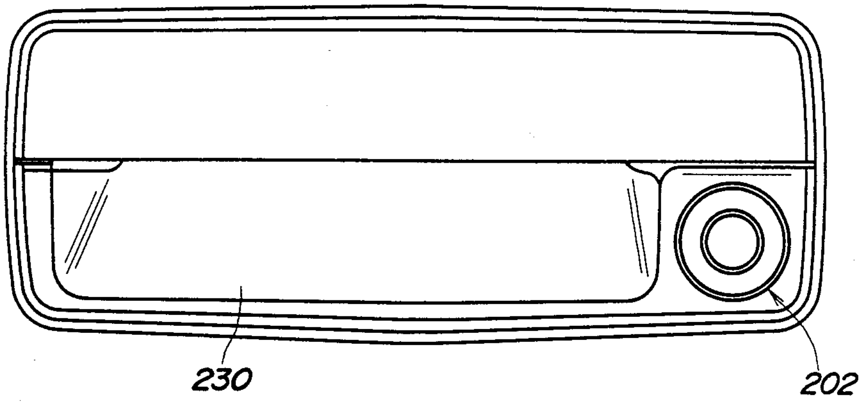
FIG. 16 is a view showing an outdoor handle of an automotive vehicle to which is applied the fourth embodiment of the invention.

FIG. 16 shows the positional relationship between the door lock 202 and the door handle 230

Figure 17:
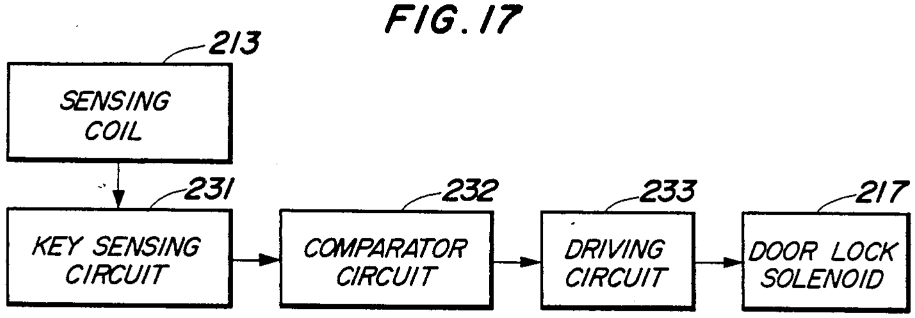
FIG. 17 is a block diagram showing the electrical construction of the key sensing and door lock system of the fourth embodiment.

FIG. 17 shows the arrangement of an example of the processing circuit constituting the key sensing device. When the output of the sensing coil 213 is received by the key sensing circuit 231, the latter supplies an output signal to a comparator circuit 232, which compares the input signal with a set code signal. If the output signal from the circuit 231 agrees with the set code signal, the comparator circuit 232 supplies a driving circuit 233 with a predetermined output signal, in response to which the driving circuit 233 supplies a driving signal to the solenoid 217 to thereby energize same for a predetermined time period (e.g. 10 seconds).

Next, the operation of the fourth embodiment constructed as above will be described.

Figure 18:
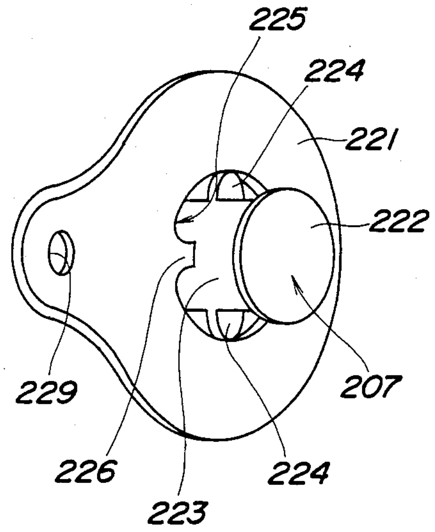
FIG. 18 is a fragmentary perspective view showing the relative positions of the cam plate and a rotor, assumed when the door lock is in an unlockable position.

When the key sensing device comprising the sensing coil 213, etc. detects that the code of the key 210 that is inserted into the key hole agrees with the set code signal, the driving circuit 233 of the processing circuit energizes the solenoid 217, whereby the plunger 218, which is normally biased to the position shown by solid lines in FIG. 13, is displaced against the force of the spring 220 to the position shown by two-dot chain lines. As a result, as shown in FIG. 18, the cam plate 221 is moved axially of the rotor 207 and accordingly the engaging protuberances 226, 226 of the cam plate 221 are moved into a position in which they are engageable with the engaging protuberances 224, 224. On this occasion, as the key 210 inserted in the key hole is turned, the rotor 207 is rotated, accompanied by a rotation of the cam plate 221, whereby the door lock unlocking mechanism 240 is actuated, that is, the door lock locking lever interlocked with the cam plate 221 via the rod is rotated to thereby render the door lock unlockable.

On the other hand, if the rotor 207 is rotated in an illegal manner such as picking, i.e. forcing the protruding tumblers back into the rotor 207 by the use of a special tool, then the key sensing device does not energize the solenoid 217 so that although the rotor 207 can be rotated, mechanical unlocking of the door lock is not achieved unless the proper key 210 is used.

Figure 19:
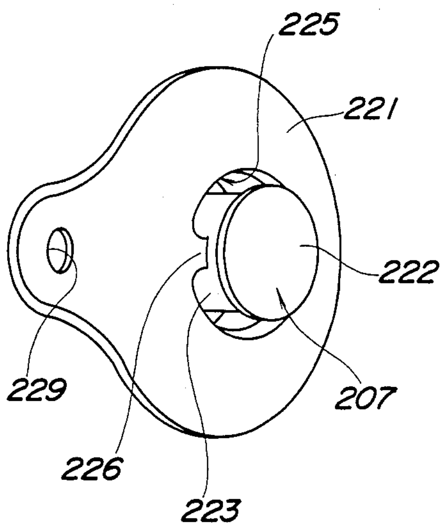
FIG. 19 is a view similar to FIG. 18 showing the relative positions assumed when the rotor is in a freely rotatable position.

When an improper key is inserted into the key hole, the comparator circuit 232 does not output the driving signal to the driving circuit 233 so that the plunger 218 of the solenoid 217 remains in the normal position biased by the spring 220, whereby the cam plate 221 is not moved and therefore the engaging protuberances 226, 226 of the cam plate 221 remain in the position where they 226 do not engage with the engaging protuberances 224, 224 of the rotor 207 as shown in FIG. 19, and as a result the rotor is freely rotatable to thereby prohibit unlocking of the door lock.

FIGS. 20 through 23 show a fifth embodiment of the invention, which is a further improvement in the unlocking mechanism of the door lock of the fourth embodiment. FIGS. 13 through 15 and 18 and 19 can also be applied to the fifth embodiment, and component elements and parts in the fifth embodiment are designated by the same numerals as their counterparts in the fourth embodiment unless designated otherwise. The fifth embodiment differs from the fourth embodiment in that there is added a locking and unlocking function based on remote control by means of an infrared-ray transmitter provided in the key 210.

Figure 20:
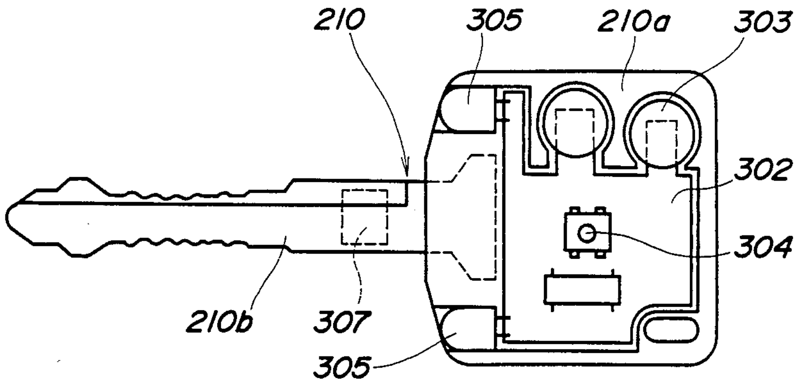
FIG. 20 is a side view of a key employed in a fifth embodiment of the invention, wherein the cover of the key head is open.
Figure 21:
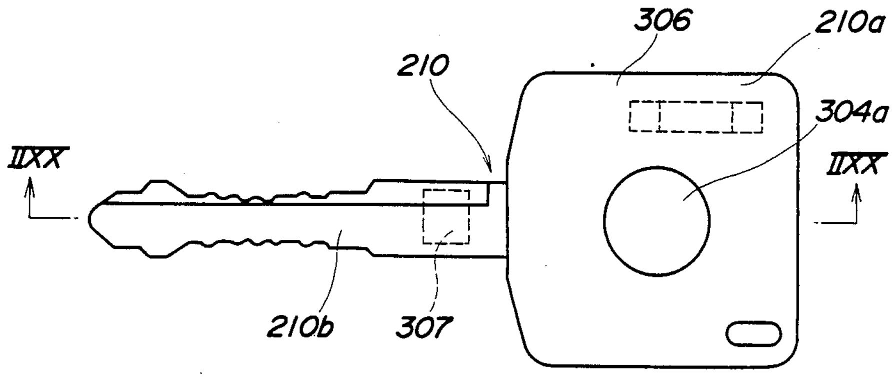
FIG. 21 is a view similar to FIG. 20, wherein the cover of the key head is closed.
Figure 22:
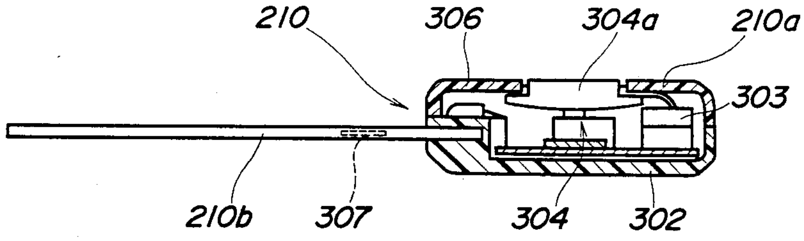
FIG. 22 is a cross-sectional view taken on line IIXX—IIXX in FIG. 21.

FIGS. 20 through 22 show examples of the key 210 employed in the fifth embodiment. A printed circuit board 302 is mounted within the head 210*a* of the key 210. A battery 303, a switch 304 operated by depressing a push button 304a, infrared-ray LED's 305, etc. are mounted on the circuit board 302. The head 210*a* is provided with a cover 306. Also, a magnetic element 307 having a second code is buried in the inserting portion 210*b* of the key 210. An electric circuit is provided on the circuit board 302 for transmitting a signal to a first key sensning portion provided on the side of the vehicle. The first key sensing portion is adapted to output a predetermined locking or unlocking signal when receiving an infrared ray carrying a first code from LED's (light emitting diodes) 305.

Figure 23:
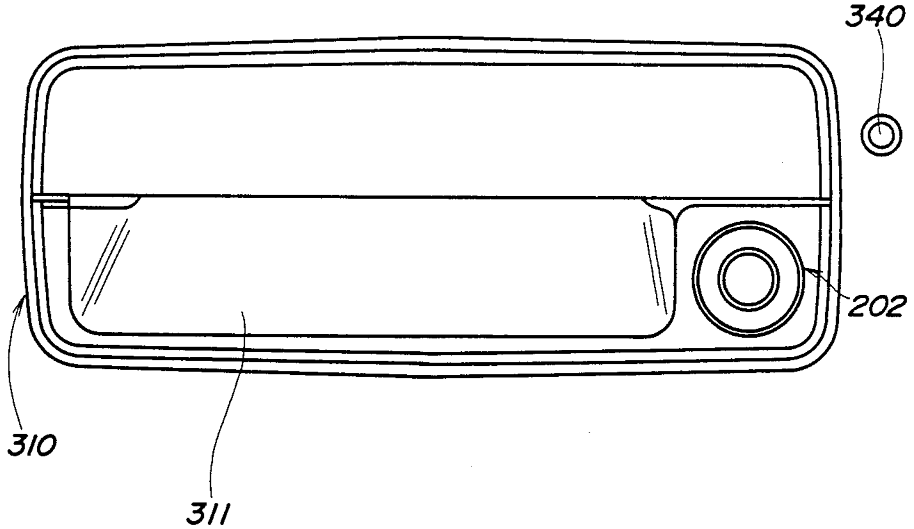
FIG. 23 is a view similar to FIG. 16 according to the fifth embodiment of the invention.
Figure 24:
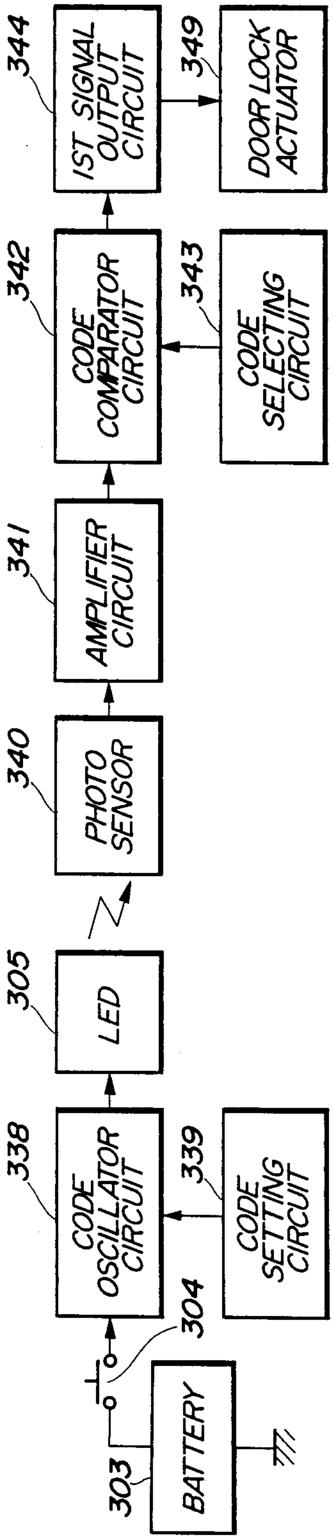
FIG. 24 is a block diagram showing a first key sensing portion of the key sensing portion according to the fifth embodiment of the invention.

FIG. 23 shows the positional relationship between the door handle 310, the door cylinder lock 202 into which the key 301 is to be inserted, and a photo sensor 340 of the first key sensing portion (FIG. 24).

FIG. 24 shows the relationship between the infraredray LED's 305 and the first key sensing portion (340–344). When the switch 304 is depressed to close, the output voltage of the battery 303 buried in the head 201*a* of the key 210 is supplied to a code oscillator circuit 338 of the electric circuit mounted on the circuit board 302, whereby the code oscillator circuit 338 is actuated to output a signal representing the first code in response to which signal the infrared ray carrying the first code of the key 210 is emitted from the LED's 305.

Incidentally, the code oscillator circuit 338 is supplied with a particular code by a code setting circuit 339 in which the particular code is set beforehand, and a infrared ray indicative of the particular code is emitted by the LED's 305.

The infrared ray emitted by the LED's 305 is sensed by the photo sensor 340, which converts the sensed infrared ray into an electric signal, which is then amplified by an amplifier circuit 341. Next, a code comparator circuit 342 constituting a first code discriminating circuit compares the thus amplified electric signal with an output signal indicative of the set code from a code selecting circuit 343 which selects a code from among a plurality of predetermined codes stored, as the set code. If the two signals agree, that is, if the code of the key 210 agrees with the set code, a first signal output circuit 344 outputs an acceptance signal to a door lock actuator 349, which in turn unlocks the door lock if the latter is locked, and locks the door lock if unlocked. The code selecting circuit 343 is adapted to select one code out of a plurality of predetermined codes stored therein as the set code.

Figure 25:
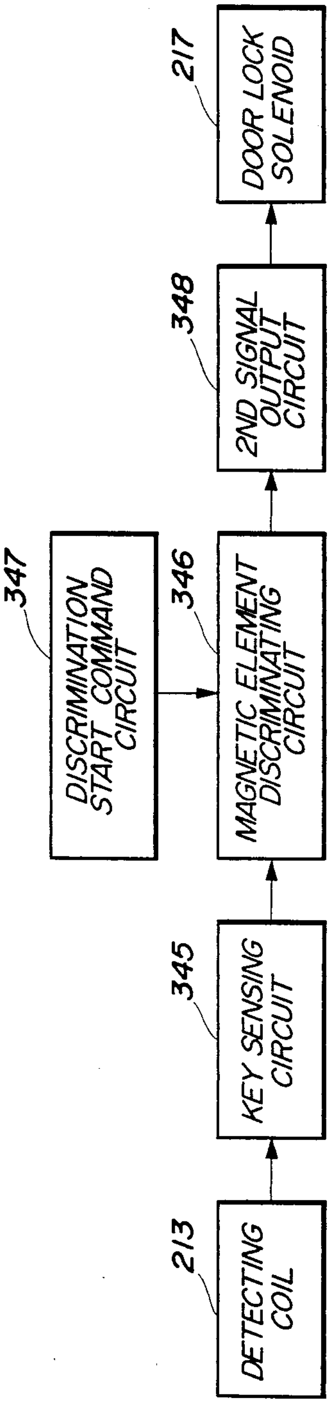
FIG. 25 is a block diagram showing a second key sensing portion of the fifth embodiment.

FIG. 25 shows an example of the circuit arrangement in the second key sensing portion (345–348). When the magnetic element 307 provided in the key 210 and also carrying a second code is inserted into the sensing coil 213, a key sensing circuit 345 (e.g. formed of an LC oscillator circuit) generates and supplies an output to a magnetic element discriminating circuit 346 constituting a second code discriminating circuit. The magnetic element discriminating circuit 346 starts discriminating the code upon receipt of a command signal from a discrimination start command circuit 347 (e.g. formed of a microswitch disposed to be closed to indicate insertion of the key 210 when the tip of the key 210 touches a predetermined portion within the key hole). If the code is discriminated to be the proper one, the magnetic element discriminating circuit 346 supplies a predetermined output to a second signal output circuit 348, which in turn generates an output in response to which the solenoid 217 in the door lock is energized to have the cam plate 22 and the rotor 207 interlocked to thereby enable unlocking of the door lock.

The operation of the fifth embodiment constructed as above will now be described.

First, remote control of locking and unlocking of the door lock is conducted as follows: When the switch 304 is closed by depressing the push button 304a provided in the key 210, the LED's 305 emit an infrared ray carrying a first code set in the key 210. Then, the photo sensor 340 of the first key sensing portion senses the emitted infrared ray whereupon a locking or unlocking command signal is outputted from the first signal output circuit 344 in response to the first code acceptance signal outputted from the code comparator circuit 342. In response to the code acceptance signal the first signal output circuit 344 determines whether or not the door lock is locked, and the door lock actuator 349 is operated such that if affirmative the door lock is unlocked, and if negative it is locked (electrical locking and unlocking).

Next, unlocking of the door lock by means of key operation will be described. When the key 210 is inserted into the key hole and if the second code of the magnetic element 307 of the key is proper, then the magnetic element discriminating circuit 346 senses a proper change in the magnetic flux of the coil and outputs a second code acceptance signal, whereupon the solenoid 217 of the door lock is energized and, in a similar manner to that in the fourth embodiment, the cam plate 221 becomes engaged with the rotor 207, and then the door lock locking lever interlocked with the cam plate 221 via the interlocking rod, not shown, is rotated to thereby enable unlocking of the door lock 240 (mechanical unlocking).

Particularly, according to the fifth embodiment, while it is possible to directly lock and unlock the door lock by the remote control based on infrared-ray transmission, it is also possible to mechanically lock and unlock the door lock by means of the key operation via the door lock mechanism in such an event that the infrared-ray transmitter is inoperable due to exhaustion of the battery.

Furthermore, the key is provided with the magnetic element and the door lock is provided with sensing and discriminating means so that even if the rotor is rotated by means of an improper key or by picking, etc., the door lock will not be unlocked because the rotor remains disengaged from the cam plate whose movement is essential for unlocking. In other words, the fifth embodiment is equipped with a double-safety construction.

What is claimed is:

1. An electronic lock and key system for automotive vehicles, comprising:

a key having a profile forming a first predetermined code, and a magnetic element forming a second predetermined code, said magnetic element being made of a magnetizable material;

a lock having a key hole into which the key is to be inserted, said key hole having a shape corresponding to said first predetermined code;

magnetism creating means associated with said lock for creating a magnetic flux corresponding to said second predetermined code when said key is inserted into said key hole of said lock;

magnetism detecting means for detecting a magnetic flux created by said magnetism creating means and generating a signal indicative of the detected magnetic flux;

decision means for comparing the value of said signal from said magnetism detecting means with a predetermined value and, when said two values agree, generating an agreement signal; and driving means responsive to said agreement signal from said decision means for enabling at least unlocking of said lock by means of said key only when said agreement signal is present, said driving means comprising:

mechanical unlocking means responsive to operation of said key when inserted into said key hole of said lock for mechanically unlocking said lock;

interlocking means for mechanically interlocking said lock with said mechanical unlocking means; and an electromagnetic actuator connected to said interlocking means and responsive to said agreement signal from said decision means for causing said interlocking means to effect mechanical interlocking between said lock and said mechanical unlocking means only when said agreement signal is present, so that when said profile of said key as inserted into said key hole corresponds to the shape of said key hole, mechanical unlocking of said lock by said mechanical unlocking means is effected by operation of said key when inserted into said key hole, whereby said lock is unlockable only when said first and second predetermined codes of said key both agree with those of said lock.

2. An electronic lock and key system as claimed in claim 1, wherein said firt predetermined code is formed based on at least one of material, dimensions, and thickness of said magnetic element.

3. An electronic lock and key system as claimed in claim 1, wherein said magnetism creating means comprises a magnet and a Hall element arranged around said key hole.

4. An electronic lock and key system as claimed in claim 1, wherein said magnetism creating means comprises a coil arranged around said key hole.

5. An electronic lock and key system as claimed in claim 1, wherein said magnetism detecting means includes means for generating said signal in for the form of a voltage of a magnitude corresponding to the magnitude of said detected magnetic flux, and said decision means includes means for comparing said voltage with a predetermined voltage value.

6. An electronic lock and key system as claimed in claim 1, wherein said magnetism detecting means includes means for generating said signal in the form of a voltage converted from a pulse frequency corresponding to the magnitude of said detected magnetic flux, and said decision means includes means for comparing said voltage with a predetermined voltage value.

7. An electronic lock and key system as claimed in claim 1, wherein said key has incorporated therein said magnetic element, and an infrared ray emitting element for emitting an infrared ray carrying a third predetermined code;

wherein said lock is formed of a door lock of an automotive vehicle, and said electronic lock and key system further includes a photo sensor provided in said automotive vehicle for sensing the infrared ray carrying said third predetermined code, secnd decision means for comparing the value of an output from said photo sensor with the value of a predetermined set code and generating a second agreement signal when the two values are equal with each other, and second driving means operatively connected to said lock for causing locking or unlocking of said lock in response to an output from said second decision means.

8. An electronic lock and key system as claimed in claim 1, wherein said lock comprises a door lock having a rotor into which said key is to be inserted, said rotor being rotatable together with said key inserted therein, said interlocking means of said driving means comprising a cam member, engaging means for engaging said cam member with said rotor of said door lock, said engaging means being adapted to engage said cam member with said rotor when said cam member is in a first position and to disengage said cam member from said rotor when said cam member is in a second position, said mechanical unlocking means being connected to said cam member for mechanically unlocking said door lock when said cam member is in a predetermined angular position, and said electromagnetic actuator is connected to said cam member and responsive to said agreement signal from said decision means for displacing said cam member into said first position, wherein when said cam member is in said first position, said cam member can be displaced into said predetermined angular position by operating said key to turn said rotor.

9. An electronic lock and key system as claimed in claim 8, wherein said first and second positions of said cam member of said unlocking mechanism correspond to different axial positions on said rotor, said cam member having an opening in which said rotor is fitted, said engaging means comprising at least one first engaging protuberance formed on said rotor and at least one second engaging protuberance formed in said opening of said cam member.

10. An electronic lock and key system as claimed in claim 4, wherein said magnetism detecting means generates said signal in the form of a voltage converted from a pulse frequency corresponding to the magnitude of said detected magnetic flux, and said decision means compares said voltage with a predetermined voltage value.

11. An electronic lock and key system for automotive vehicles, comprising:

a key having a profile forming a first predetermined code, and a magnetic element forming a second predetermined code;

a door lock having a key hole and a rotor into which the key is to be inserted, said key hole having a shape corresponding to said first predetermined code, and said rotor being rotatable together with said key inserted therein,;

magnetism creating means for creating a magnetic flux corresponding to said second predetermined code when said key is inserted into said key hole of said lock;

magnetism detecting means for detecting a magnetic flux created by said magnetism creating means and generating a signal indicative of the detected magnetic flux;

decision means for comparing the value of said signal from said magnetism detecting means with a predetermined value and, when said two values agree, generating an agreement signal; and driving means responsive to said agreement signal from said decision means for enabling at least unlocking of said lock by means of said key, said driving means comprising:

mechanical unlocking means responsive to operation of said key when inserted into said key hole of said lock for mechanically unlocking said lock;

interlocking means for mechanically interlocking said lock with said mechanical unlocking means; and an electromagnetic actuator connected to said interlocking means and responsive to said agreement signal from said decision means for causing said interlocking means to effect mechanical interlocking between said lock and said mechanical unlocking means only when said agreement signal is present, so that when said profile of said key as inserted into said key hole corresponds to the shape of said key hole, mechanical unlocking of said lock by said mechanical unlocking means is effected by operation of said key when inserted into said key hole;

said interlocking means of said driving means comprising:

a cam member, engaging means for engaging said cam member with said rotor of said door lock, said engaging means being adapted to engage said cam member with said rotor when said cam member is in a first position and to disengage said cam member from said rotor when said cam member is in a second position;

said mechanical unlocking means being connected to said cam member for mechanically unlocking said door lock when said cam member is in a predetermined angular position; and said electromagnetic actuator is connected to said cam member and responsive to said agreement signal from said decision means for displacing said cam member into said first position, wherein when said cam member is in said first position, said cam member can be displaced into said predetermined angular position by operating said key to turn said rotor.

12. An electronic lock and key system as claimed in claim 11, wherein said first and second positions of said cam member of said interlocking means correspond to different axial positions on said rotor, said cam member having an opening in which said rotor is fitted, said engaging means comprising at least one first engaging protuberance formed on said rotor and at least one second engaging protuberance formed in said opening of said cam member.

13. An electronic lock and key system as claimed in claim 11, wherein said first predetermined code is formed based on at least one of material, dimensions, and thickness of said magnetic element.

14. An electronic lock and key system as claimed in claim 11, wherein said magnetism creating means comprises a magnet and a Hall element arranged around said key hole.

15. An electronic lock and key system as claimed in claim 11, wherein said magnetism creating means comprises a coil arranged around said key hole.

16. An electronic lock and key system as claimed in claim 15, wherein said magnetism detecting means generates said signal in the form of a voltage converted from a pulse frequency corresponding to the magnitude of said detected magnetic flux, and said decision means compares said voltage with a predetermined voltage value.

17. An electronic lock and key system as claimed in claim 11, wherein said magnetism detecting means includes means for generating said signal in the form of a voltage of a magnitude corresponding to the magnitude of said detected magnetic flux, and said decision means includes means for comparing said voltage with a predetermined voltage value.

18. An electronic lock and key system as claimed in claim 11, wherein said magnetism detecting means includes means for generating said signal in the form of a voltage converted from a pulse frequency corresponding to the magnitude of said detected magnetic flux, and said decision means includes means for comparing said voltage with a predetermined voltage value.

19. In electronic lock and key system as claimed in claim 11, wherein said key has incorporated therein said magnetic element, and an infrared ray emitting element for emitting an infrared ray carrying a third predetermined code;

and wherein said electronic lock and key system further includes:

a photo sensor provided in said automotive vehicle for sensing the infrared ray carrying said third predetermined code, a further decision means for comparing the value of an output from said photo sensor with the value of a predetermined set code and generating a further agreement signal when the two values are equal with each other; and a further driving means operatively connected to said lock for causing locking or unlocking of said lock in response to an output from said further decision means.

* * * * *